I. L. MYERS & I. CORL.

Improvement in Fruit-Gatherers.

No. 128,648. Patented July 2, 1872.

Witnesses
E. H. Bates.
F. B. Curtis

Inventor.
Isaac L. Myers,
Israel Corl.
Chipman Hosmer & Co
Attys.

UNITED STATES PATENT OFFICE.

ISAAC L. MYERS AND ISRAEL CORL, OF AGRICULTURAL COLLEGE, PENNSYLVANIA, ASSIGNORS OF ONE-THIRD OF THEIR RIGHT TO D. J. JOHNSON, OF SAME PLACE.

IMPROVEMENT IN FRUIT-GATHERERS.

Specification forming part of Letters Patent No. 128,648, dated July 2, 1872.

*To all whom it may concern:*

Be it known that we, I. L. MYERS and I. CORL, of Agricultural College, in the county of Centre and State of Pennsylvania, have invented a new and valuable Improvement in Fruit-Pickers; and we do hereby declare that the following is a full, clear, and exact description of the construction and operation of the same, reference being had to the annexed drawing making a part of this specification, and to the letters and figures of reference marked thereon.

Figure 1:
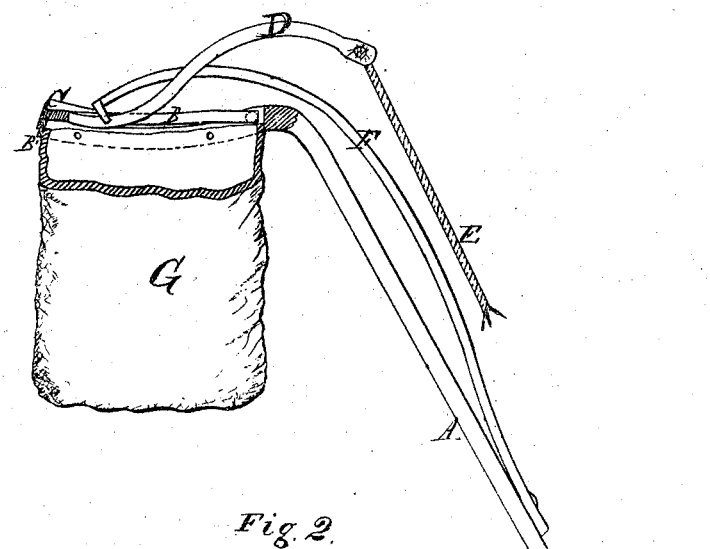
Figure 2:
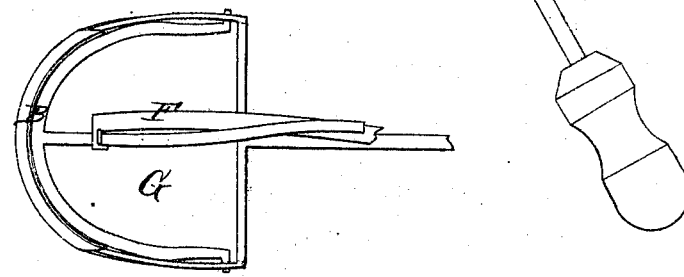

Figure 1 of the drawing is a representation of a vertical section of our invention. Fig. 2 is a plan view of the jaws.

This invention has relation to an improvement in implements for gathering fruit from trees; and the novelty consists in the construction and adaptation of parts, whereby the stems of the fruit are cut and the fruit gathered into a bag for the purpose, all the working parts of the implement being under control of the operator standing on the ground. In this invention the stems are cut by the power of the spring.

Referring to the accompanying drawing, A represents the long handle, provided with a pair of hinged jaws, B B'. The latter is provided with a cutting-flange, C, which severs the stems of the fruit when the jaw B is forcibly closed. D represents a curved arm extending back from the forward edge of the jaw B; and E, a cord attached to the rear end of it, thence passing to the hand of the operator, who, by pulling it, can open the jaws. When he releases the cord the jaws are brought together by means of a spring, F, one end of which is secured to the handle A, while the other rests upon the curved arm D. A fruit-bag, G, is attached to the jaw or ring B' to receive the fruit as it is severed from the tree. The object of using the spring to force the jaws together is to enable the implement to be used among thick branches, when more power is required to pull the jaws sufficiently apart to let in the apples than is necessary to cut the stems.

We claim as our invention—

The fruit-picker herein described, having the oblique handle A, the elliptic spring F, fixed lower jaw B' with bag G, bent stop-lever D, and cord E, all constructed and arranged as specified.

In testimony that we claim the above we have hereunto subscribed our names in the presence of two witnesses.

ISAAC LAMBORN MYERS.
ISRAEL CORL.

Witnesses:
 JOS. GATES,
 JOHN CUSTALARDER.